United States Patent
Carlson et al.

[11] Patent Number: 6,105,548
[45] Date of Patent: Aug. 22, 2000

[54] MOUNTING APPARATUS FOR AN ENGINE AND TRANSMISSION

[75] Inventors: Robert B. Carlson, Brookfield; Patrick Bruener, Hartland; Glen Eifert, Hartford, all of Wis.; William W. Doolittle, Ann Arbor, Mich.

[73] Assignee: Briggs & Stratton Corporation, Milwaukee, Wis.

[21] Appl. No.: 09/185,350

[22] Filed: Nov. 3, 1998

[51] Int. Cl.[7] ............................... F02B 77/00; B60K 5/12
[52] U.S. Cl. ...................................... 123/195 A; 180/291
[58] Field of Search .......................... 123/195 R, 195 A, 123/90.27, 90.31; 180/312, 299, 291, 227, 228; 294/81.3; 248/672, 674

[56] References Cited

U.S. PATENT DOCUMENTS

| | | | |
|---|---|---|---|
| 1,285,767 | 11/1918 | Mason et al. | 180/291 |
| 1,635,213 | 7/1927 | Holden | 180/291 |
| 1,738,532 | 12/1929 | Harbour | 180/291 |
| 1,929,104 | 10/1933 | Summers | 180/291 |
| 4,147,318 | 4/1979 | McDonald | 123/195 R |
| 4,237,996 | 12/1980 | Matsuda et al. | 180/229 |
| 4,395,980 | 8/1983 | Tominage et al. | 123/90.27 |
| 4,645,172 | 2/1987 | Wilson | 248/674 |
| 4,936,616 | 6/1990 | Williams | 294/81.3 |
| 5,390,758 | 2/1995 | Hunter et al. | 180/227 |
| 5,857,538 | 1/1999 | Chambers | 180/312 |
| 5,876,013 | 3/1999 | Ott | 180/228 |

FOREIGN PATENT DOCUMENTS

| | | | |
|---|---|---|---|
| 204849 | 10/1923 | United Kingdom | 180/291 |
| 603643 | 6/1948 | United Kingdom | 180/291 |

*Primary Examiner*—Willis R. Wolfe
*Assistant Examiner*—Hyder Ali
*Attorney, Agent, or Firm*—Michael Best & Friedrich LLP

[57] ABSTRACT

A mounting apparatus for an assembly including an internal combustion engine and a transmission includes an elongated member having a first portion interconnected with the engine housing of the engine adjacent the cylinders and above the crankcase of the engine. The elongated member also includes a second portion mounted on a bell housing or crankcase cover portion of the engine housing. The elongated member may include an overhang portion extending over an engine fan. The elongated member may be disposed between a first and a second cylinder of the engine. The elongated portion may also include lifting portions defining apertures for facilitating raising and lowering the engine.

12 Claims, 4 Drawing Sheets

MOUNTING APPARATUS FOR AN ENGINE AND TRANSMISSION

FIELD OF THE INVENTION

The invention relates to apparatus for supporting an engine and a transmission within a motor vehicle.

BACKGROUND

It is known to support an engine within a motor vehicle with a three-point mounting system. Typical prior art mounting systems include a single chassis mounting point at opposite ends of an engine and transmission assembly. A third chassis mounting point is provided adjacent the bottom of the engine and transmission assembly. The three mounting points are interconnected with the vehicle's chassis to support the engine and transmission and prevent rotation of the engine and transmission.

SUMMARY

The invention provides an elongated member which may be used in an improved three-point mounting system. In one embodiment, the elongated member includes flanges mounted on the engine housing at a first pair of mounting points. The elongated member extends generally parallel to the crankshaft, and has an end mounted on the bell housing, crankcase cover, or another portion of the engine housing at a second pair of mounting points. Alternatively, the end may be mounted at a single mounting point on the bell housing, crankcase cover, or another portion of the engine housing.

In one aspect of the invention, the elongated member may extend between first and second cylinders of the engine. In another aspect of the invention, the elongated member may include a lifting portion for conveniently attaching a hoist or lifting apparatus to raise and lower the engine alone, or the engine and transmission assembly, with respect to the motor vehicle.

DETAILED DESCRIPTION

Figure 1:
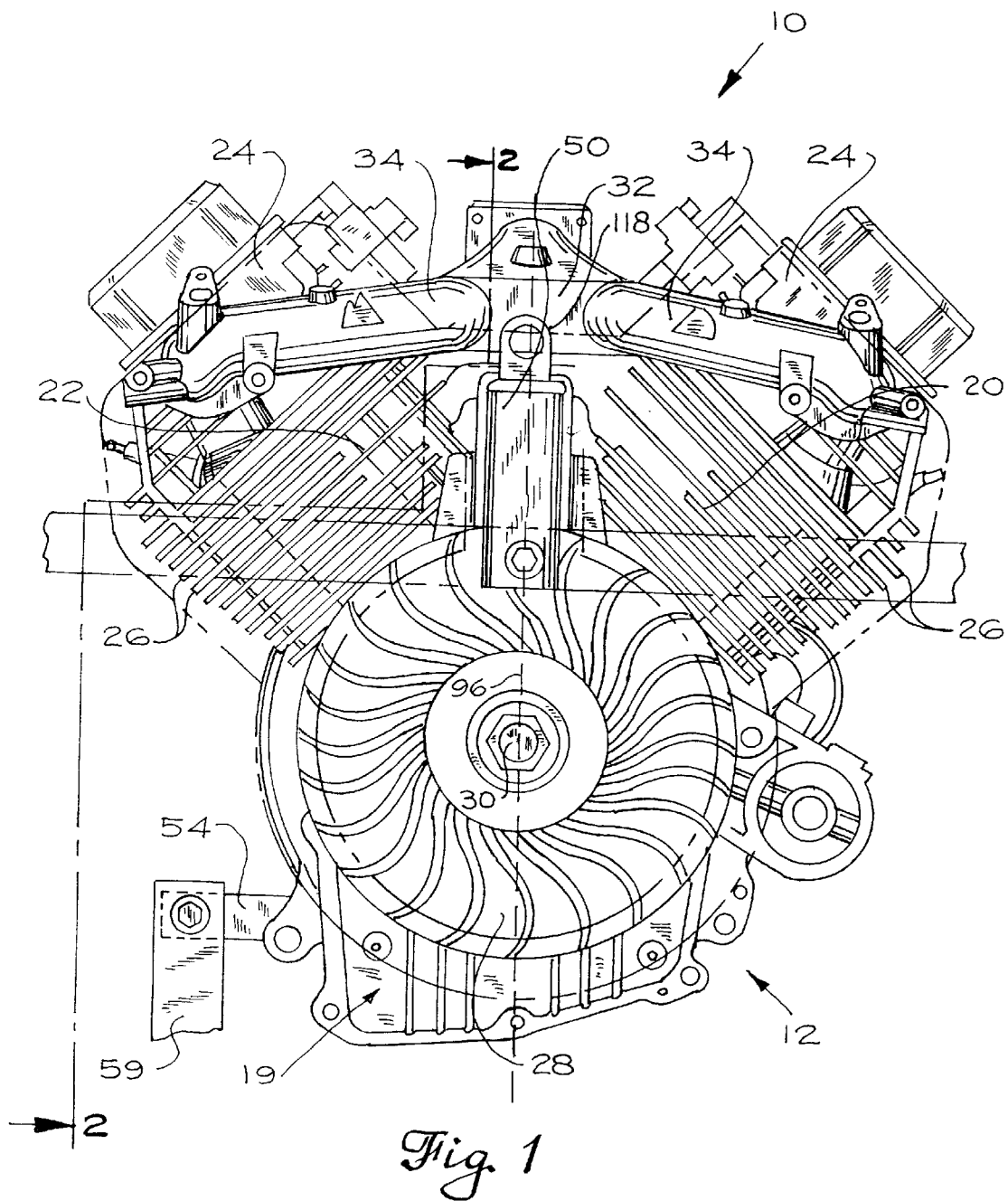
FIG. 1 is an end view of an assembly including an internal combustion engine and transmission being supported by a mounting apparatus according to the present invention.
Figure 2:
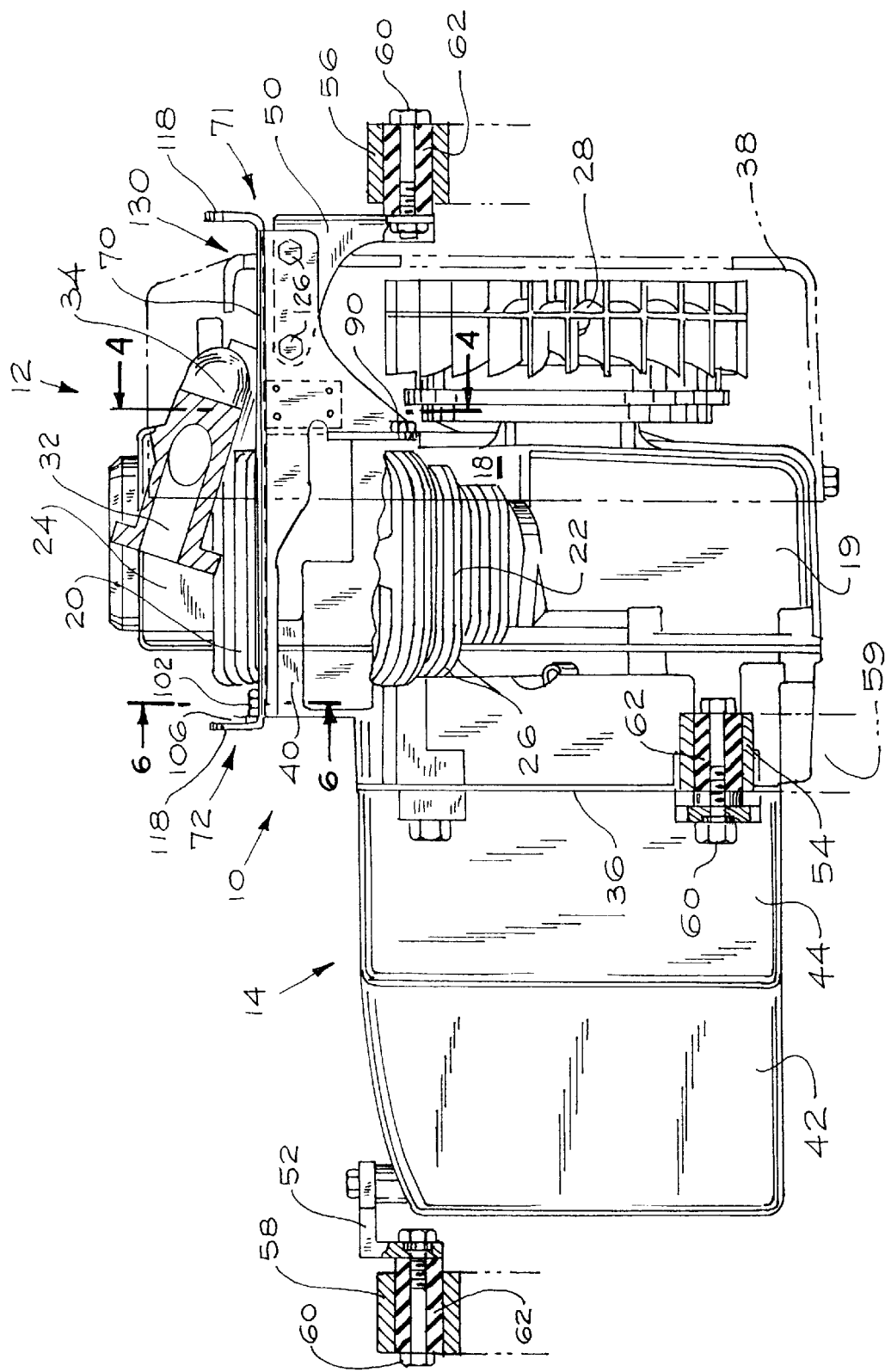
FIG. 2 is a side partial section view of the assembly taken along line 2—2 in FIG. 1.

FIGS. 1 and 2 illustrate an assembly 10 including an internal combustion engine 12 and a transmission 14 that is supported in a motor vehicle by a mounting assembly or mounting apparatus. The mounting assembly may be used in many different motor-powered vehicles, including motorcycles, automobiles, aircraft, and watercraft.

The engine 12 includes an engine housing 18. As used herein, "engine housing" includes the crankcase, cylinders, and crankcase covers (including the bell house cover) of the engine. It is understood that the various components of the engine housing may be separable from the other components of the engine housing. Alternatively, the components of the engine housing may be formed integrally with each other.

Referring to FIGS. 1 and 2, the illustrated engine housing 18 includes a vertically-split crankcase 19 divided into two castings, and having front and back halves. The illustrated engine housing 18 also includes first and second cylinders 20, 22 mounted on or formed integrally with the crankcase 19.

Each cylinder 20, 22 has a cylinder head portion 24 and air-cooling fins 26. A fan 28 is mounted on an end of a crankshaft 30 for rotation therewith. An air intake manifold 32 is disposed on the top of the engine 12 and includes air supply passages 34 leading to each of the cylinders 20, 22. Although the illustrated engine 12 is a V-shaped two-cylinder air-cooled engine, the invention may be used to support other types of engines that are water-cooled, air-cooled, or oil-cooled, and that have one, or more than two, cylinders.

Referring to FIG. 2, the transmission 14 and the engine 12 are joined at a generally vertical interface 36. A blower housing 38, shown in phantom, generally houses the engine fan 28. A crankcase cover casting or a bell housing 40 including a crankcase cover is integrally-formed with or attached to the rest of the engine housing 18, and houses a flywheel and clutch (not shown) for the engine 12. The transmission 14 includes a transmission housing made of first and second portions 42, 44. The first and second portions 42, 44 may be integrally formed with each other as a single unit or provided separately, or the transmission housing could be formed from more than two castings.

Figure 3:
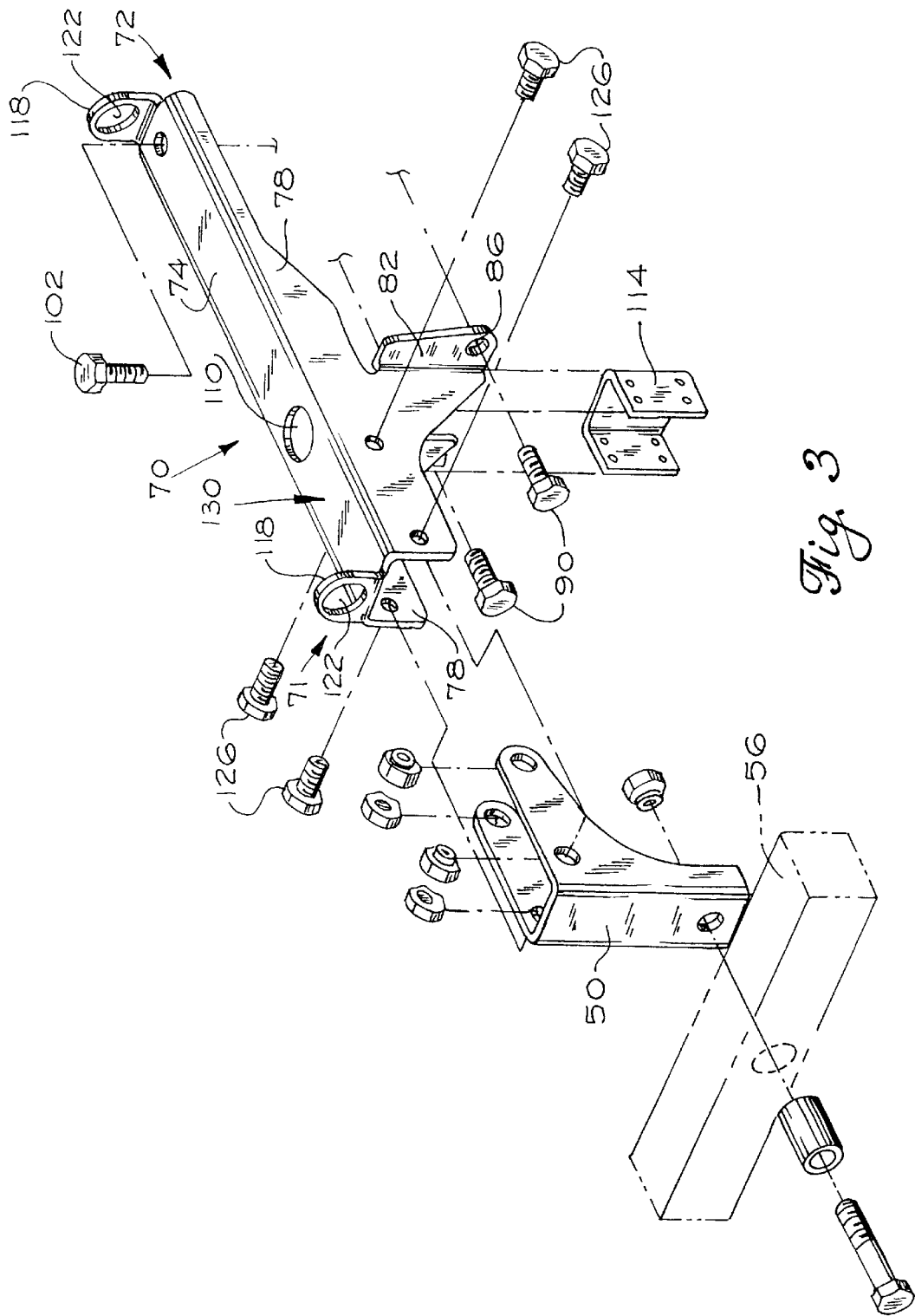
FIG. 3 is an exploded view of a portion of the mounting apparatus.

As shown in FIGS. 1–3, the engine 12 is supported in the vehicle by a first chassis mounting member 50, a second chassis mounting member 52 and a third chassis mounting member 54. The first, second, and third chassis mounting members 50, 52, 54 are mounted on first, second, and third portions 56, 58, 59 of the vehicle's chassis with bolts 60 and bushings 62. The bushings 62 are made of a resilient material, such as rubber, to dampen vibrations.

An elongated member 70 is interconnected with the first chassis mounting member 50. The elongated member 70 includes first and second opposite ends 71, 72. The elongated member 70 is at least partially disposed between the first and second cylinders 20, 22 (FIGS. 2–4), and is generally parallel to the crankshaft 30. Referring to FIG. 3, the elongated member 70 includes a top wall 74 and a pair of generally parallel side walls 78 depending from the top wall 74. Flanges 82 facilitate the interconnection of the elongated member 70 to the engine housing 18 and are formed integrally with the side walls 78.

Figure 4:
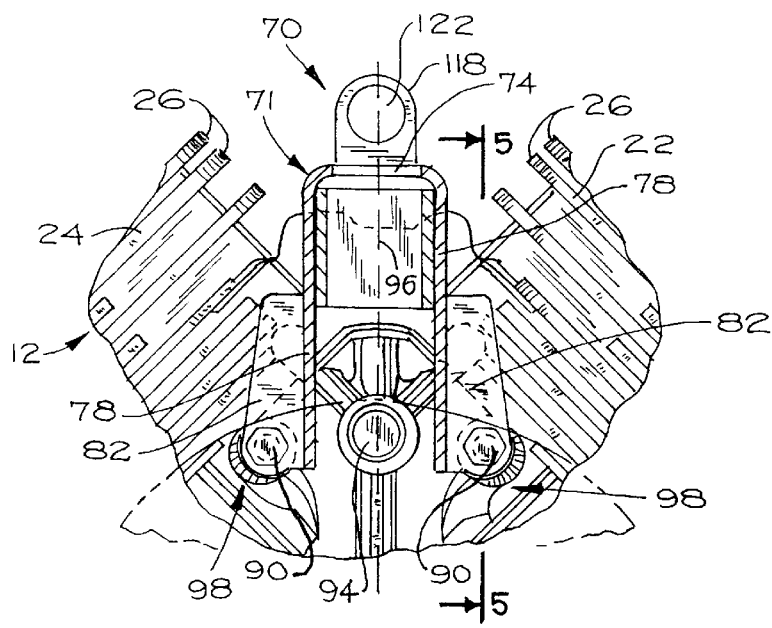
FIG. 4 is a cross-section view taken along line 4—4 in FIG. 2.
Figure 5:
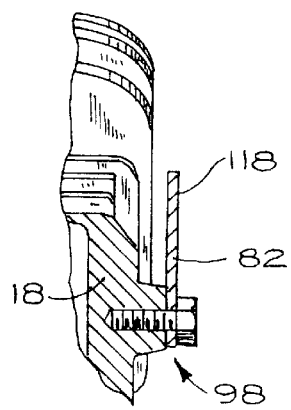
FIG. 5 is a cross-section view taken along line 5—5 in FIG. 4.

The flanges 82 each include an aperture 86 through which a fastener or other suitable interconnecting means 90 may be passed to facilitate securing the elongated member 70 to the engine housing 18. As shown in FIGS. 4 and 5, threaded apertures are provided in the engine housing 18 adjacent the cylinders 20, 22 on either side of the engine's cam shaft 94. In an overhead cam engine, the threaded apertures would be provided on either side of a plane 96 (FIGS. 1 and 4) including the engine's crankshaft. The threaded apertures provide a first pair of mounting points 98 where the flanges 82 of the elongated member 70 are mounted on the engine housing 18. Because the cylinders 20, 22 each include a substantially cylindrical bore at least partially defined by a cylinder wall, each of the threaded apertures may be provided in the cylinder wall and may extend along a line that does not intersect the cylindrical bore. This takes advantage of the curved nature of the cylinder walls, providing more cylinder material to surround the threaded apertures. If cylinders are removable, it may be necessary to move the mounting points 98 lower to engage a different portion of the engine housing 18.

The first pair of mounting points 98 are positioned in the most advantageous location. If the mounting points 98 were moved down, they would interfere with components of the engine 12, and the flanges 82 would lose rigidity because of the extra length. If the mounting points 98 were moved up along the cylinders 20, 22, they may interfere with the cylindrical bores or they may interfere with the cooling aspect of the fins 26. If the mounting points 98 were moved closer together, they would interfere with the operation of the cam shaft 94 in a push rod type of engine.

Alternatively, mounting bosses may be formed in the engine housing 18 to provide the mounting points 98. The mounting bosses may be raised with respect to the other surfaces of the engine housing 18 adjacent the mounting points 98 to provide material for the formation of the threaded apertures. Such mounting bosses may be disposed anywhere adjacent the cylinders 20, 22.

Figure 6:
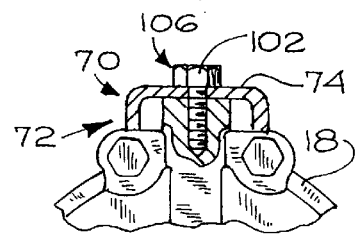
FIG. 6 is a cross-section view taken along line 6—6 in FIG. 2.
Figure 7:
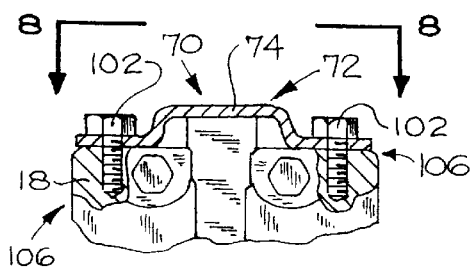
FIG. 7 is an alternative embodiment of the mounting arrangement shown in FIG. 6.
Figure 8:
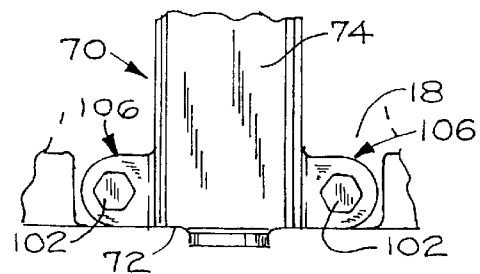
FIG. 8 is a view taken along line 8—8 in FIG. 7.

The second end 72 of the elongated member 70 is mounted on the bell housing 40 or another portion of the engine housing 18 with interconnecting means (e.g., a fastener 102). As seen in FIGS. 7 and 8, the second end 72 of the elongated member 70 may be mounted on the bell housing 40 or another portion of the engine housing 18 at a second pair of mounting points 106. Alternatively, and as shown in FIGS. 2, 3, and 6, a single fastener 102 may be used to mount the second end 72 of the elongated member 70 at a single second mounting point 106.

In an alternative embodiment, the second end 72 of the elongated member 70 may be mounted on the transmission housing. However, it is preferable to mount the second end 72 on the bell housing 40 or another portion of the engine housing 18 to allow separate manufacturing and shipping of the engine 12 with the elongated member 70 already mounted thereon. Additionally, having the elongated member 70 mounted only on the engine housing 18 allows the engine 12 to be hoisted independent of the transmission 14.

Referring to FIG. 3, an access aperture 110 is provided in the top wall 74 to provide access to a sensor (e.g., a variable reluctance sensor, or a timing position/rpm sensor) in the engine 12. A generally U-shaped support member 114 is spot welded to the elongated member 70 at least partially between the side walls 78. The U-shaped support member 114 adds structural stability to, and resists deformation of, the elongated member 70 (including the flanges 82) under operating loads. The U-shaped member 114 also serves to support the sensor. While the U-shaped member 114 is preferred, support members of other shapes may be used and are within the scope of the invention.

The elongated member 70 also includes lifting portions 118 extending up from the top wall 74 and defining apertures 122. A portion of a lifting apparatus (not shown), such as hooks of an engine hoist, may be conveniently passed through the apertures 122 and interconnected with the lifting portions 118 to hoist the assembly 10, or the engine 12 alone.

Referring to FIG. 3, the first chassis mounting member 50 is a generally L-shaped bracket in the preferred embodiment, although it may be provided in any other suitable shape. The first chassis mounting member 50 is interconnected with the elongated member 70 with suitable interconnecting means, such as fasteners 126. As seen in FIG. 2, the first chassis mounting member 50 is interconnected with an overhang portion 130 of the elongated member 70, with the overhang portion 130 extending over a portion of the fan 28. The first chassis mounting member 50 therefore extends down on the side of the fan 28 that is opposite the engine 12, such that the fan 28 is at least partially disposed between the first chassis mounting member 50 and the engine 12. For other vehicles, the first chassis mounting member 50 may extend upwardly to the first portion 56 of the vehicle chassis, and the first chassis mounting member 50 may be shaped other than the L-shape shown. In some applications, the mounting member 50 may be eliminated altogether by aligning the first portion 56 with the elongated member 70.

It should be noted that other configurations of the mounting apparatus are contemplated and fall within the scope of the invention. For example, the first chassis mounting member 50 and the elongated member 70 could be formed as one piece, in which case the first chassis mounting member 50 would include all elements of the elongated member 70 described above. The elongated member 70 may extend the entire length of the assembly 10, in which case the first chassis mounting member 50, second chassis mounting member 52, and the elongated member 70 would be a unitary piece.

Although particular embodiments of the present invention have been shown and described, other alternative embodiments will be apparent to those skilled in the art and are within the intended scope of the present invention. Thus, the present invention is to be limited only by the following claims.

What is claimed is:

1. An internal combustion engine comprising:
   an engine housing including at least one cylinder;
   a crankshaft disposed in said engine housing;
   an elongated member that extends generally parallel to said crankshaft, said elongated member including
   a top wall;
   two side walls disposed on opposite sides of said top wall; and
   a first portion mounted on a first portion of said engine housing adjacent said cylinder.

2. The internal combustion engine of claim 1, wherein said at least one cylinder includes first and second cylinders, wherein said first portion of said elongated member includes first and second flanges, wherein said first flange is mounted to said engine housing adjacent said first cylinder, and wherein said second flange is mounted to said engine housing adjacent said second cylinder.

3. The internal combustion engine of claim 1, wherein said at least one cylinder includes a first cylinder including a first cylinder wall at least partially defining a first substantially cylindrical bore, and a second cylinder including a second cylinder wall at least partially defining a second substantially cylindrical bore, said internal combustion engine further comprising:
   a first threaded aperture formed in said first cylinder wall; and
   a second threaded aperture formed in said second cylinder wall;
   wherein said first and second threaded apertures provide a first pair of mounting points for said elongated member.

4. The internal combustion engine of claim 3, wherein said first threaded aperture extends along a line that does not intersect said first cylindrical bore, and wherein said second threaded aperture extends along a line that does not intersect said second cylindrical bore.

5. The internal combustion engine of claim 1, wherein said elongated member is also mounted to a second portion of said engine housing.

6. The internal combustion engine of claim 1, wherein said engine housing includes a bell housing portion, and wherein said elongated member includes a second portion that is mounted to said bell housing portion.

7. The internal combustion engine of claim 1, further comprising a support member interconnected with said elongated member and disposed at least partially between said side walls.

8. The internal combustion engine of claim 7, wherein said elongated member has an aperture to provide clearance for a sensor, and wherein said support member at least partially supports said sensor.

9. The internal combustion engine of claim 1, wherein said elongated member includes a lifting portion for facilitating lifting and lowering the engine.

10. The mounting apparatus of claim 9, wherein said lifting portion has a pair of apertures providing clearance to facilitate lifting and lowering said engine.

11. The internal combustion engine of claim 9, wherein said lifting portion extends upwardly from said elongated member.

12. The internal combustion engine of claim 1, further comprising a fan, wherein said elongated member includes an overhang portion disposed substantially above said fan.

* * * * *